(12) United States Patent
Friese et al.

(10) Patent No.: US 10,668,643 B2
(45) Date of Patent: Jun. 2, 2020

(54) MACHINING DEVICE

(71) Applicant: HOMAG GMBH, Schopfloch (DE)

(72) Inventors: Stefan Friese, Pfalzgrafenweiler (DE); Volker Schmieder, Mössingen (DE); Christian Sturm, Sulz am Neckar (DE)

(73) Assignee: HOMAG GMBH, Schopfloch (DE)

( * ) Notice: Subject to any disclaimer, the term of this patent is extended or adjusted under 35 U.S.C. 154(b) by 389 days.

(21) Appl. No.: 15/512,700

(22) PCT Filed: Sep. 9, 2015

(86) PCT No.: PCT/EP2015/070600
§ 371 (c)(1),
(2) Date: Mar. 20, 2017

(87) PCT Pub. No.: WO2016/045968
PCT Pub. Date: Mar. 31, 2016

(65) Prior Publication Data
US 2017/0297218 A1    Oct. 19, 2017

(30) Foreign Application Priority Data
Sep. 22, 2014  (DE) .................. 10 2014 219 097
Jul. 3, 2015   (DE) .................. 10 2015 212 541

(51) Int. Cl.
*B27C 5/06*   (2006.01)
*B25B 5/00*   (2006.01)
*B25B 5/14*   (2006.01)
*B27M 1/08*   (2006.01)
*B25B 1/18*   (2006.01)
*B25B 1/02*   (2006.01)
(Continued)

(52) U.S. Cl.
CPC .................. *B27C 5/06* (2013.01); *B23Q 3/00* (2013.01); *B25B 1/02* (2013.01); *B25B 1/18* (2013.01); *B25B 5/003* (2013.01); *B25B 5/142* (2013.01); *B27C 9/02* (2013.01); *B27M 1/08* (2013.01)

(58) Field of Classification Search
CPC .. B23Q 3/00; B23Q 3/06; B23Q 3/069; B25B 11/00; B27C 5/00; B27C 5/02; B27C 5/06; B27M 1/08
USPC .................. 409/145, 159, 172, 219
See application file for complete search history.

(56) References Cited

U.S. PATENT DOCUMENTS 3,215,175 A    11/1965  Hibner

FOREIGN PATENT DOCUMENTS

DE    101 37 839 A1    2/2003
EP    1 992 464 A2    11/2008
(Continued)

OTHER PUBLICATIONS

International Search Report, PCT/EP2015/070600, dated Dec. 16, 2015, 2 pgs.
(Continued)

*Primary Examiner* — Matthew Katcoff
(74) *Attorney, Agent, or Firm* — Paul D. Strain, Esq.; Strain & Strain PLLC

(57) ABSTRACT

The invention relates to a machining device, in particular for machining workpieces of wood, wood materials, plastic or the like, comprising a workpiece table with a workpiece holder for holding at least one workpiece, and a feeding device for supplying at least one workpiece to the workpiece table, wherein the workpiece can be positioned in three dimensions with respect to the workpiece table. The invention further relates to a corresponding method.

31 Claims, 6 Drawing Sheets

(51) Int. Cl.
*B23Q 3/00* (2006.01)
*B27C 9/02* (2006.01)

(56) References Cited

FOREIGN PATENT DOCUMENTS

| | | |
|---|---|---|
| EP | 2 067 586 A2 | 6/2009 |
| EP | 2 241 425 A1 | 10/2010 |
| WO | WO 2010/041285 A1 | 4/2010 |

OTHER PUBLICATIONS

German Search Report, Appl. No. 10 2015 212 541.6, dated Sep. 18, 2015, 8 pgs.

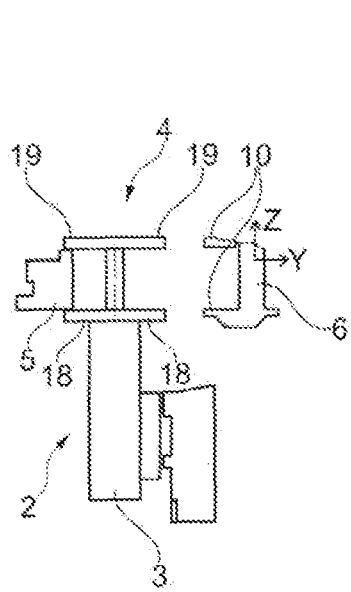
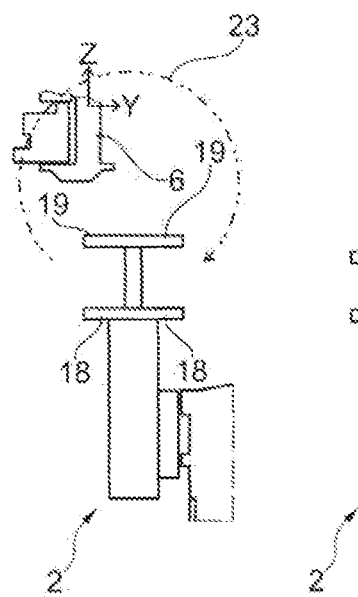
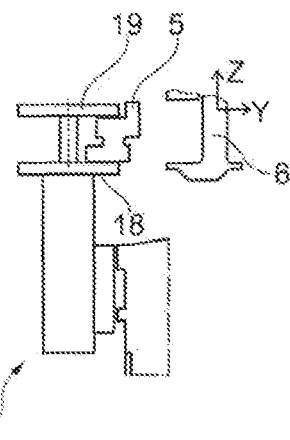
Fig. 3           Fig. 4           Fig. 5
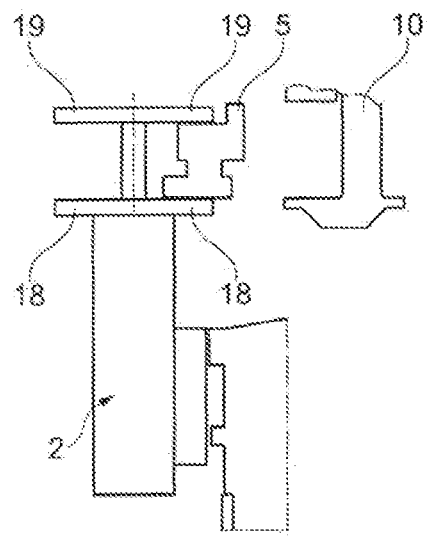
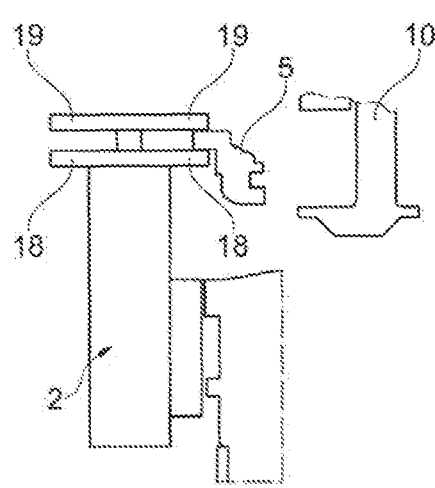
Fig. 6           Fig. 7

MACHINING DEVICE

TECHNICAL FIELD

The invention relates to a machining device, in particular for machining workpieces made of wood, wood materials, plastic or the like, in particular according to the preamble of claim 1, and to a method for operating such a machining device.

PRIOR ART

Machining, devices for machining workpieces, in particular for machining work pieces made of wood, wood materials, plastic or the like, are widely known in the prior art. Such machining devices customarily have a workpiece table with a workpiece holder by means of which a workpiece can be arranged and can be held at least temporarily by clamping in order to machine the workpiece during the clamping holding. Such workpiece tables with workpiece holders can be designed to be substantially stationary or to be shiftable by means of advancing devices.

In the case of a substantially stationary design of the workpiece table with the workpiece holder, the tool for machining the workpiece can be brought up to the workpiece itself in order to bring about machining of the workpiece on account of a relative movement produced between workpiece and tool.

As an alternative thereto, in the case of a substantially shiftable design of the workpiece table with the workpiece holder, the workpiece for machining can be brought up to the tool itself in order to bring about machining of the workpiece on account of a relative movement produced between workpiece and tool.

For this purpose, the machining device can have, for example, a stationary or shiftable gantry or a stationary or shiftable extension arm or the like, on which the tool for machining the workpiece can be guided in turn in a stationary or shiftable manner in order, together with a possible shifting of the workpiece, to be able to undertake the intended machinings on the workpiece. In this case, either the workpiece can be guided past the tool, or vice versa, or both the workpiece and the tool can also be shifted during the machining, and therefore a specific relative movement is provided between tool and workpiece in order to be able to machine the workpiece, for example along a side or edge.

It has thus been disclosed by DE 101 37 839 A1 that two workpiece tables are arranged shiftably next to each other, wherein the one workpiece table or the other workpiece table holds the tool with its workpiece holder, while the workpiece table is guided by means of its advancing devices past the tool in order to machine a side edge of the workpiece. Subsequently, one workpiece table can be shifted with respect to the other workpiece table into a transfer position, and the workpiece can be rechucked from the one workpiece table directly onto the other workpiece table, and therefore subsequently the other side edge of the workpiece that is not yet machined can be machined.

However, the required height of the workpiece for the setup is constant here because the clamping jaws of the workpiece holder of the tool table are fixedly predetermined and the lower clamping jaws are fixed in their height on the tool table. If, however, a workpiece with a contour which differs in height on both opposite side edges is intended to be machined therewith because, for example, the respective lower edge is intended to be formed offset from the other one, this workpiece cannot readily be machined by means of the machining device designed in this manner because, for the rechucking from one workpiece table to the other workpiece table, there is no defined rechucking state.

During the production of window frame parts, in particular made of wood, a very large extent of different profiles has to be produced, which is customarily carried out by milling. The longitudinal sides and also the narrow sides of the frame parts should customarily also be machined here. In order to permit the evermore frequently desired increased light incidence, in particular in living rooms, the width of the window frame parts are being ever further reduced. This leads to only very limited free clamping surfaces still being available on the window frame parts for holding the window frame parts in the clamping jaws in the workpiece holder for the machining of the workpiece, wherein this problem occurs evermore frequently if a first longitudinal side of the window frame part has already been profiled.

In the case of workpiece tables according to DE 101 37 839 A1, the provided clamping jaws of the workpiece holder rest as fixing elements on the lower and on the upper support surface of the window frame part and thus clamp the workpiece between them. Although this has the advantage that the workpiece can maintain a constant height level in the vertical direction and optionally also a constant position in the lateral direction during clamping and rechucking operations, it also has the disadvantage, however, that clamping can be undertaken only on the upper and lower support surfaces.

However, in the case of modern window frame parts as workpieces, it is ever more frequently necessary for the workpiece also to be able to be clamped in regions of the lateral profiling that have already been machined, i.e., for example, in rebates that have already been produced.

SUMMARY OF THE INVENTION, OBJECT, SOLUTION, ADVANTAGES

It is the object of invention to provide a machining device which permits a significant increase an the machining efficiency even in the case of shorter workpieces. It is also the object of the invention to provide a method in this respect.

This object with regard to the machining device is achieved with the features of claim 1.

An exemplary embodiment of the invention relates to a machining device, in particular for machining work pieces made of wood, wood materials, plastic or the like, with at least one workpiece table with a workpiece holder for holding at least one workpiece, and with a supply device for supplying at least one workpiece the at least one workpiece table, wherein the at least one workpiece is positionable in three dimensions with respect to the at least one workpiece table. In this case, one workpiece can be supplied to a workpiece table and positioned thereon and held by the latter, or a plurality of workpieces can be supplied to a workpiece table, positioned thereon and held by the latter. If a plurality of workpiece tables are provided, one or more workpieces can in each case be supplied to the one or the other workpiece table and can in each case be positioned thereon and in each case held by the latter. It is thereby permitted that also more than one workpiece can be held simultaneously on a workpiece table and can be machined substantially in one setup, i.e. virtually simultaneously. By providing, for example, two workpiece tables, the workpieces set up on a workpiece table can be completely machined, with workpieces of the one or of the other workpiece table then advantageously being able to be alternately machined at a tool. The effect achieved by this is that the at least one workpiece can be clamped not only on its upper side and lower side, but can also be clamped on different surfaces, such as on rebates, edges, etc produced by the machining. As a result, after a first setup on the upper side and the lower side of the workpiece, following initial machining rechucking onto other surfaces for clamping purposes can be undertaken in order to be able to securely hold the workpiece and in order to be able to further machine same. As a result, greater efficiency and quality of the machining is also achieved if the at least one workpiece, for example, can be machined in one setup on three sides, i.e. on a longitudinal side and on two narrow sides. If two or more workpieces are clamped in one setup, the efficiency can be further increased because the workpiece changing time then does not occur after each individual workpiece.

It is thus particularly advantageous if one workpiece table is provided or if two or more workpiece tables are provided which are each shiftable independently of the other and which can each clamp one or more than one workpiece in each case independently of one another. With more than one workpiece table, the efficiency increases once again.

To this end, it is advantageous according to the inventive concept if the at least one workpiece table or at least one of the workpiece tables or each of the workpiece tables is shiftable at least in its longitudinal direction relative to the supply device. As a result, depending in each case on the stopped-at position of the corresponding workpiece table, the at least one workpiece can be positioned in a different position on said workpiece table. Also as a result, a plurality of workpieces can be positioned at different positions of the workpiece table.

It is also particularly advantageous if the supply device is shiftable at least in one direction relative to the at least one workpiece table. As a result, the at least one workpiece can be positioned individually on said workpiece table and in particular can also be individually rechucked.

It is furthermore advantageous if the at least one workpiece table or one of the workpiece tables or each of the workpiece tables is in each case shiftable in its longitudinal direction relative to the supply device and the supply device is shiftable in two directions relative to said respective workpiece table. As a result, the three dimensions of the shifting are distributed between said respective workpiece table and said supply device, and therefore a simple construction of the machining device is made possible.

It is particularly advantageous if said workpiece table or the respective workpiece tables is or are shiftable in its or their longitudinal direction by means of a respective advancing unit.

It is also advantageous if the respective workpiece table has a workpiece holder with a number of clamping elements which are arranged spaced apart from one another in the longitudinal direction. As a result, at least one workpiece or a plurality of workpieces can be securely clamped in the longitudinal direction of the respective workpiece table, wherein it is entirely also possible for a plurality of workpieces to be arranged one after another in their longitudinal direction.

It is also advantageous if a clamping element has at least one pair of clamping jaws with two clamping jaws, wherein at least one of the clamping jaws is shiftable relative to the other clamping jaw. As a result, at least one workpiece can be securely clamped between the clamping jaws. The clamping elements are arranged spaced apart here in such a manner that end finishing machining on a narrow side of a workpiece can also be undertaken between two clamping elements. It is advantageous here if the workpiece can be machined on its narrow side or its narrow sides in particular over the full height of the workpiece. The distance between the clamping elements is advantageously of such a size here that a tool, such as, for example, a milling head can be moved between the clamping elements and, with one working cycle or with two or more working cycles, it is possible for the narrow side of the workpiece to be machined and to be profiled over the full height of the workpiece. This means that a corresponding tool is shiftable between two clamping elements because the distance between the clamping elements is of a size sufficient for the workpiece to be moved through and machined by means of the tool. The distance between the clamping elements is advantageously between 200 and 800 mm, in particular between 300 and 700 mm and furthermore advantageously between 400 and 500 mm, and therefore a milling head of approximately 90 to 200 mm can still pass through between the clamping elements in order to be able to machine the workpiece end on a narrow side.

It is also advantageous if a clamping element has two pairs of clamping jaws each with two clamping jaws, wherein in each case at least one of the clamping jaws of a pair is shiftable relative to the other clamping jaw of the pair. It is advantageous here if the shiftable clamping jaws are connected to each other and are jointly shiftable. Alternatively, the shiftable clamping jaws can be designed to be shiftable independently of each other.

Short tools can advantageously also be held only with one clamping element, and therefore the workpiece can be machined at least on one of its longitudinal sides, on a narrow side and optionally also on a second narrow side. By contrast, longer workpieces can also be clamped by two or more clamping elements.

It is also advantageous if the clamping jaws of a pair each protrude in a direction perpendicular to the longitudinal direction. One workpiece can thus be clamped by one longitudinal side while the other longitudinal side of the workpiece can be machined.

It is also advantageous if the clamping jaws of a first pair protrude in a first direction perpendicular to the longitudinal direction, wherein the clamping jaws of a second pair protrude in the direction opposed to the first direction perpendicular to the longitudinal direction. Two clamping regions are thus provided which lie adjacent to each other in the longitudinal direction of the workpiece or of the workpiece table, which permits simple rechucking between the clamping regions.

It is also advantageous if the supply device is shiftable in both directions by means of at least one advancing unit, preferably by means of two advancing units. Independent shifting can thus be carried out in both directions.

According to the concept according to the invention, it is expedient if at least one workpiece is suppliable by means of the supply device to at least one of the workpiece tables in such a manner that one workpiece or a plurality of workpieces is holdable simultaneously by one of the workpiece tables. The supply device serves here to the effect that workpieces can be supplied one after another to the one or to the other workpiece table in order to achieve a high degree of efficiency. While at least one workpiece or two or more workpieces is or are clamped in the one workpiece table and therefore is or are shifted and is or are machined by means of a tool, the supply device parallel thereto can transport at least one workpiece or two or more workpieces to another workpiece table and can position same there so that said workpiece or said workpieces can be shifted with said workpiece table and correspondingly machined. The at least one workpiece is advantageously rechucked here in the respective workpiece table itself and not from one workpiece table to another workpiece table, and therefore the machining of workpieces takes place autonomously in respective workpiece table and the involvement of a plurality of workpiece tables for machining one individual workpiece is not necessary.

It is also advantageous here if more than one workpiece, i.e. two workpieces more, are suppliable simultaneously by means of the supply device to at least one of the workpiece tables in such a manner that a plurality of workpieces are holdable simultaneously by one of the workpiece tables. The plurality of workpieces can be supplied here to the workpiece table simultaneously or else one after another.

It is also advantageous if the supply device has a number of clamping elements which are arranged spaced apart from one another in the longitudinal direction of the supply device. A longer workpiece can therefore also be securely held so that it does not slip during the supplying. The clamping elements can also be arranged here in such a manner that a plurality of workpieces can be securely arranged, such as one after another in their longitudinal direction, and therefore they can be simultaneously supplied by the supply device to the workpiece table.

It is also advantageous if a clamping element has at least one pair of clamping jaws with two clamping jaws, wherein at least one of clamping jaws is shiftable relative to the other clamping jaw. As a result, a workpiece can be clamped between the clamping jaws and therefore secured in order to be held and shifted by the supply device. The supply device therefore permits the picking up and transporting of at least one workpiece to one of the workpiece tables to be undertaken or at least one workpiece to be removed from a workpiece table and to be transported away.

It is also advantageous if a clamping element has two pairs of clamping jaws each with two clamping jaws, wherein in each case at least one of the clamping jaws of a pair is shiftable relative to the other clamping jaw of the pair. As a result, specific clamping of at least one workpiece can be undertaken. The shifting can be undertaken, for example, pneumatically, hydraulically or by electric motor, which can be simple to realize and is permanently operationally reliable.

It is also advantageous if the clamping jaws of a pair each protrude in a direction perpendicular to the longitudinal direction of the supply device. As a result, even longer workpieces can be gripped along the supply device and supplied to a workpiece table or a plurality of workpieces can be gripped along the supply device and supplied to a workpiece table.

In a further exemplary embodiment of the invention, it is expedient if the clamping jaws of a first pair protrude in a first direction perpendicular to the longitudinal direction, wherein the clamping jaws of a second pair protrude in a direction opposed to the first direction perpendicular to the longitudinal direction. Workpieces or other elements can thus be gripped and held in each case by means of the supply device on opposite longitudinal sides of the supply device.

In an advantageous exemplary embodiment of a machining device, it is also expedient if the supply device, at least in a central region, as viewed in the longitudinal direction, has clamping jaw pairs which are arranged spaced apart from one another and fixed with respect to one another in the longitudinal direction. The respective workpiece can thus be securely clamped, and distances between the clamping jaw pairs can be selected in such a manner that workpieces with typical workpiece lengths can be securely held. A workpiece can optionally also be machined on a narrow side if a tool is shiftable between two adjacent clamping jaw pairs.

It is also expedient if the supply device, at least on one of its end regions, as viewed in the longitudinal direction, has at least one clamping jaw pair which is arranged so as to be shiftable in the longitudinal direction. As a result, in particular at the ends of the supply device, as viewed in the longitudinal direction thereof, the distance between two adjacent clamping jaw pairs with respect to each other can be set in order also to be able to hold shorter workpieces by means of at least two clamping jaw pairs. It is also advantageous if the supply device, at both of its end regions, as viewed in the longitudinal direction, has at least one clamping jaw pair which is arranged so as to be shiftable in the longitudinal direction. It is particularly advantageous here if the supply device, at least on one of its end regions, or else at its two end regions, as viewed in the longitudinal direction, has at least two clamping jaw pairs which are arranged so as to be shiftable in the longitudinal direction. As a result, short workpieces can be particularly readily held and supplied to the respective workpiece table by the supply device.

It is also advantageous if the shiftable clamping jaw pair or the shiftable clamping jaw pairs of the supply device is or are adjustable and fixable in their position in the longitudinal direction. As a result, the distance between the shiftable clamping jaw pairs can be set manually or alternatively in an automated manner.

It is particularly advantageous if the shiftable clamping jaw pair or the shiftable clamping jaw pairs is or are shiftable by means of a drive unit. The shifting can thus be undertaken pneumatically, hydraulically or by electric motor, by means of a pneumatic or hydraulic actuator or electric motor actuator.

According to a further aspect, it is expedient if one of the clamping jaws is rotatable relative to the other clamping jaw, in particular by 90°. It is thus advantageous in particular if the upper clamping jaw is rotatable in order to release the workpiece there for machining. The rotation can advantageously take place, for example, by 90°.

The object with respect to the method is achieved with the features of claim 26.

An exemplary embodiment of the invention relates to a method for operating a machining device, in particular for machining workpieces made of wood, wood materials, plastic or the like, with a workpiece table with a workpiece holder for holding at least one workpiece, and with a supply device for supplying at least one workpiece to the workpiece table, wherein the workpiece is guided to the workpiece table and is positioned thereon by means of the supply device, wherein the workpiece is positioned in three dimensions with respect to the workpiece table.

According to the invention, it is expedient if the workpiece table is shifted at least in its longitudinal direction relative to the supply device, and/or the supply device is shifted at least in one direction relative to the workpiece table in order to position the workpiece with respect to the workpiece table.

It is also advantageous if the workpiece table is shifted in its longitudinal direction relative to the supply device, and/or the supply device is shifted in at least one of two directions relative to the workpiece table in order to position a workpiece with respect to the supply table.

Furthermore, it is advantageous if one workpiece can be clamped in the workpiece holder of the workpiece table. A plurality of workpieces can also be clamped next to one another in the longitudinal direction.

Furthermore, it is advantageous if the workpiece holder has pairs of clamping jaws by means of which a workpiece can be clamped in the workpiece holder of the workpiece table.

It is particularly advantageous if the workpiece holder has at least two sets of pairs of clamping jaws by means of which a workpiece can be clamped in the workpiece holder of the workpiece table, wherein the workpiece is transferable from a first set of pairs to a second set of pairs.

Furthermore, it is also advantageous if the workpiece, following clamping in the workpiece holder, is machined on a longitudinal side by means of at least one tool.

According to the invention, it is also advantageous if the workpiece, following clamping in the workpiece holder, is machined with end finishing machining on a narrow side by means of at least one tool.

It is particularly advantageous here if the workpiece, following clamping in the workpiece holder, is machined with end finishing machining on both narrow sides by means of at least one tool. Particularly efficient machining can thus be achieved.

It is particularly advantageous here if, following machining of the workpiece by clamping same in a set of clamping jaws, the workpiece is rechucked into the second set of clamping jaws, for the further machining of the workpiece, in particular on a second longitudinal side and/or on at least one of the narrow sides.

It is also advantageous if, following the machining, the workpiece is removed from the workpiece table by the supply device.

It is also particularly advantageous if a glass strip or another element is removable from a workpiece by means of the supply device with at least individual pairs of its clamping jaw pairs.

It is thus also advantageous if a fitting, an RFID chip or another element is suppliable to a workpiece by means of the supply device with at least individual pairs of its clamping jaw pairs.

Further advantageous refinements are described in the description below of the figures and by the dependent claims.

BRIEF DESCRIPTION OF THE DRAWINGS

The invention is explained in more detail below on the basis of at least one exemplary embodiment with reference to the drawings, in which:

FIG. 3 shows a sectional illustration through a workpiece holder,

FIG. 4 shows a sectional illustration through a workpiece holder in a different operating position, FIG. 5 shows a sectional illustration through a workpiece holder in a different operational position, FIG. 6 shows a sectional illustration through a workpiece holder in a different operational position, FIG. 7 shows a sectional illustration through a workpiece holder in a different operational position.

PREFERRED EMBODIMENT OF THE INVENTION

Figure 1:
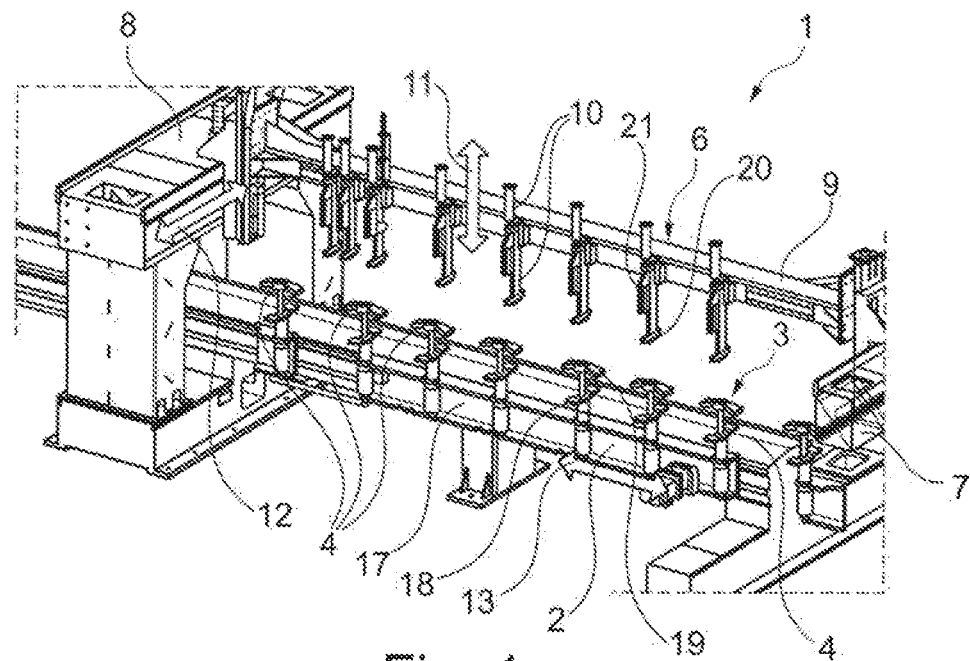
FIG. 1 shows a schematic illustration of a detail of a machining device.
Figure 2:
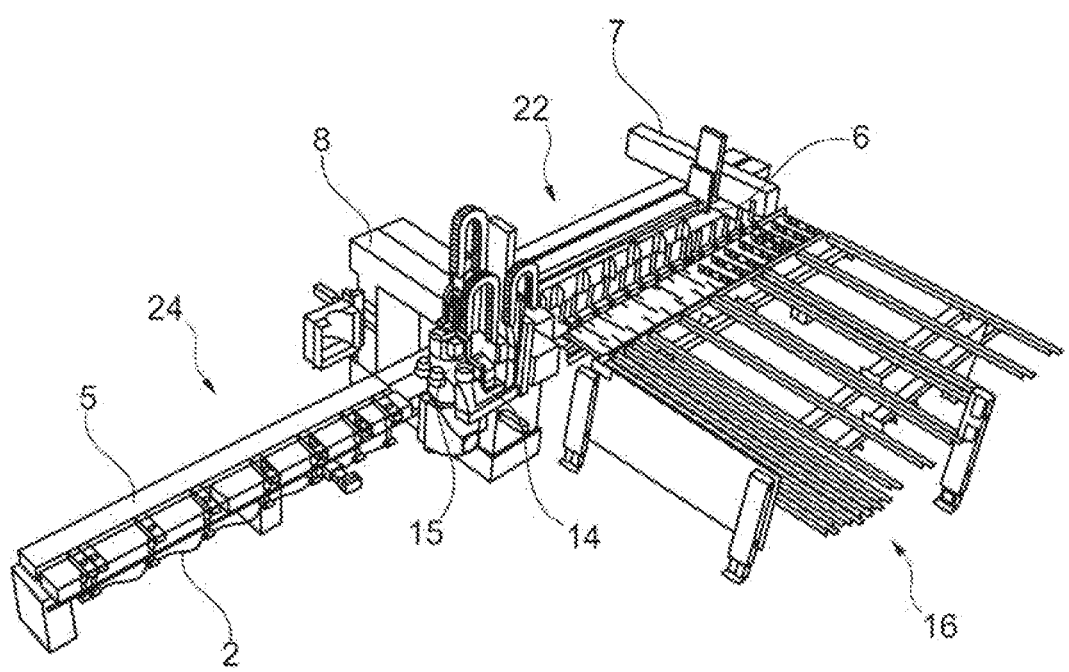
FIG. 2 shows a schematic illustration of a machining device.

FIGS. 1 and 2 show a machining device 1, in particular for machining workpieces 5 made of wood, wood materials, plastic or the like. The workpieces 5 here can be, for example, more elongate, beam-like workpieces or more flat, more two-dimensional, board-like workpieces.

The machining device 1 has a workpiece table 2 with a workpiece holder 3 with clamping elements 4 for clamping a workpiece, by means of which workpieces 5 can be securely held for machining. The workpiece table 2 is preferably designed connected to an advancing unit, by means of which the workpiece table 2 is designed so as to be shiftable in direction 13. The direction 13 is advantageously oriented perpendicular here to the direction 11 and to the direction 12.

Furthermore, a supply device 6 is provided which serves to supply a workpiece 5 to the workpiece holder 3 of the workpiece table 2 and to place the workpiece 5 on the workpiece table 2.

Furthermore, a device framework is provided on which the supply device 6, also called manipulator, is arranged so as to be shiftable. A guide device 8 is also provided to which the supply device 6 is furthermore coupled so as to be shiftable. The supply device 6 is thus arranged in a shiftable manner on one side on the device framework 7 and on the other side on the guide device 8. The supply device 6 can be moved here with its elongate carrier element 9 and the clamping elements 10 arranged thereon both in the vertical direction 11 and in the lateral direction 12 which is oriented perpendicular to the direction 11.

The guide device 8 is advantageously designed as a gantry or as a crossbar on which a tool side 14 is shiftably arranged in order to be able to shift a tool 15 in direction 12 and/or in direction 11. As a result, the workpiece 5 can be shifted in the longitudinal direction of the workpiece table 2 and, in the process, can be guided past the tool 15 for machining.

Furthermore, a supply and/or discharge table 16 can also be provided, by means of which the workpieces can be supplied and/or removed, and therefore a stock of workpieces can be made available to the machining device 1 in order to be able to machine said workpieces efficiently and to be able to remove same again from the machining device 1 and supply same for further processing or commissioning.

According to the invention, clamping of the workpieces with three-dimensional shifting or positioning is provided. For this purpose, three axes or three manipulation directions in the x, y and in the z direction are provided for the "three-dimensional" clamping of the workpieces 5. In this case, the x direction represents the direction 13, the y direction represents the direction 12, and the z direction represents the direction 11.

The machining device 1 of FIGS. 1 and 2 represents a device in which the workpieces 5 can be shifted relative to the workpiece table 2 along the three axes mentioned and therefore the workpiece 5 can be set up in such a manner that it can be shifted in the directions mentioned during the transition from one setup to a second setup.

The various possibilities for shifting the workpiece 5 relative to the workpiece table 2 in order to achieve an attractive and in particular also economical device concept are distributed here between the workpiece table 2 and the supply device 6. Fundamentally different combination possibilities for distributing the shifting possibilities along the directions 11, 12 and 13 mentioned are possible here.

FIGS. 1 and 2 show a machining device 1 in which the following combination of allocations of directions is used:
Shifting Along the x Axis: workpiece table
Shifting Along the y Axis: supply device, and
Shifting Along the z Axis: supply device.

The workpiece table 2 is preferably designed as a table which is of elongate design and has a basic body 17 which is of correspondingly elongate design and on which the workpiece holder 3 with the clamping elements 4 arranged adjacent to one another is arranged. The clamping elements 4 are arranged adjacent to one another along the x direction 13, and therefore a workpiece can be held with the clamping elements, wherein the workpiece can be held in a manner oriented along the x direction 13 by the clamping elements 4. Since the workpiece table 2 is shiftable with its advancing device in the x direction 13, the workpiece holder 3 which is connected thereto is also shiftable in the x direction and therefore the clamping elements 4 are also shiftable in the x direction. As a result, before the workpiece is positioned in the clamping elements 4 of the workpiece table 2, the workpiece table 2 can be shifted in the x direction 13 in order to define the position of the workpiece 5 in the x direction 13 relative to the workpiece table 2.

The clamping elements 4 consist of two clamping jaws 18, 19 which are shiftable with respect to each other and are shiftable in the z direction in order to clamp a workpiece 5 between them. Alternatively, different clamping elements can also be provided. The clamping jaws 18, 19 protrude here in the y direction 12 in order to be able to clamp a workpiece 5 between them. It is advantageous here if the clamping jaws 18, 19 are designed in such a manner that the clamping jaws 18, 19 are arranged in pairs such that they are arranged protruding in both y directions, and therefore two setups are possible between the two clamping jaw pairs 18, 19.

The distance between adjacent clamping elements 4 can advantageously be selected here to be of a size sufficient in order to be able to carry out an end finishing machining on a narrow side or advantageously also on both narrow sides of the workpiece 5, i.e. on the short workpiece sides, between two adjacent clamping elements 4 and the longitudinal machining of a longitudinal side of the workpiece in one setup.

The supply device 6 likewise has an elongate basic body and an elongate carrier element 9 on which the clamping elements 10 with two clamping jaws 20, 21, which protrude in the y direction 12 and are shiftable in the z direction 11, are arranged adjacent to and spaced apart from one another. The supply device 6 is itself designed so as to be shiftable in the y direction and in the z direction. As a result, the workpieces 5 can be offset in the x, y and in the z direction relative to the clamping jaws 18, 19 both upon insertion into the clamping jaws 18, 19 of the workpiece holder 3 and during the rechucking from one clamping jaw pair to the other clamping jaw pair between machining operations.

It is also possible here that a plurality of workpieces 5 are arranged next to one another in the x direction and are clamped at the same time in the clamping jaws 18, 19, and therefore they can machined simultaneously.

The individual workpieces 5 can be picked up next to one another simultaneously with the supply device 6, and therefore their position can also be changed simultaneously in the x, y and z direction.

For the insertion of workpieces, even machining which has been undertaken on the unmachined part, such as, for example, previously separated glass strips, can be taken into consideration here, and therefore the workpiece can optionally even be clamped in a rebate which is present, instead of on the upper side and lower side of the workpiece 5.

By means of the offset of the workpieces 5, even parts with a negative clamping yoke offset downward can be picked up and clamped. The parts are normally clamped in the clamping device on the upper side and lower side. The overlapping of the two clamping surfaces is the "clamping yoke". The trend is toward profiles having a very small or even a negative clamping yoke, if any at all. This does not give rise to any overlapping of the upper side and lower side. The workpiece then has to be clamped in the rebate.

The device according to the invention can advantageously be used as described below.

The workpiece is picked up, for example as an unmachined part, by the supply device 6 from the retrieval position of the workpiece inlet on the supply table 16.

The workpiece 5 is subsequently placed by means of the supply device into the clamping jaws 18, 19 of the workpiece holder for the first setup. The position of the workpiece 5 can be oriented variably in the y and z direction, depending on the intended machining operations to be carried out on the workpiece 5, wherein the y and z orientation can be selected by shifting the supply device 6 along the axes of the supply device 6.

FIG. 3 shows a clamping element 4 of the workpiece holder 3. Two pairs of clamping jaws 18, 19 are provided here, wherein a workpiece 5 accommodated between the clamping jaws 18, 19 is illustrated on the left side of the clamping element 4.

With the clamping elements 10 of the supply device 6, the workpiece 5 can be gripped and inserted into the setup shown. The clamping jaws 18, 19 can grip and clamp the workpiece 5 here.

The workpiece table 2 can be shifted here in the x direction by means of an advancing device, in particular into the machining region 24, in order to machine the workpiece 5 by means of a tool, for example to carry out a longitudinal profiling, or to undertake end finishing machining and/or drilling.

The workpiece table 2 subsequently moves back again in the x direction into the charging region 22 in which the supply device inserts the workpiece, rechucks same and/or removes same again.

The workpiece 5 is removed from the clamping jaws 18, 19 by the supply device 6 and shifted from the left side of the clamping jaws 18, 19, see FIG. 4, to the right side of the clamping jaws 18, 19 by means of shifting in the y and z direction according to arrow 23. The workpiece 5 is guided on the right side of the clamping jaws 18, 19 into the clamping jaws 18, 19 and is inserted and clamped there for the second setup, see FIG. 5. Depending on the desired machining, the workpiece can also be introduced with an offset in the x direction into the clamping jaws 18, 19, for example in order to permit drilling from above if, in the first setup, a collet covered said region and therefore drilling was not possible.

The workpiece 5 can be positioned in a correspondingly variable manner in the x, y and/or z direction and inserted into the clamping jaws 18, 19.

The workpiece table 2 subsequently moves again in the x direction into the machining region 24 in order to profile the workpiece in the second longitudinal side and optionally also to carry out further machining operations.

The workpiece table 2 subsequently moves again into the charging region 22 and the ready-finished workpiece can be removed by the supply device 6 and deposited on the depositing position on the workpiece outlet.

The above-described device has the advantage that diverse clamping possibilities can be provided in order to clamp and to machine the workpiece. This is advantageously achieved by the workpiece being able to be shifted in the three directions: x direction, y direction and z direction.

The upper and/or lower sides required for the setup in earlier devices can thereby be released during rechucking for carrying out machining operations in order to permit a machining operation which machines the upper or lower side of the workpiece in such a manner that only small webs of the upper or lower side are left or the upper or lower side is entirely removed.

This minimizes the non-productive and/or handling times since a plurality of workpieces can also be positioned and machined simultaneously. This can be carried out with maximum precision during the manufacturing of parts.

It is preferred if the supply device is equipped with a plurality of clamping elements 10 which are arranged next to one another in a manner spaced apart from one another in the x direction. At least the central clamping elements 10 are arranged spaced apart here in an advantageously fixed and rather elongated grid.

It is advantageous here if at least one clamping element 10 is arranged at at least one lateral end of the supply device so as to be shiftable in the x direction. As a result, the distance between the clamping elements 10 can be changed in order to be adapted to the length of a workpiece.

The figures show that the workpieces can be held horizontally next to one another in various positions by the two clamping jaw pairs of a workpiece table.

Alternatively, for the supply, at least two supply tables can be provided in such a manner that the finished parts and the unmachined parts can be placed one above another.

An alignment station can also be provided by means of which the workpieces can be aligned and in particular can also be pushed rectilinearly, in particular also in the x direction.

It is also possible that, in one exemplary embodiment of the invention, a double supply device is provided by means of which two workpieces can also be supplied synchronously and inserted into the clamping jaws.

A display of a double occupancy loading can also be provided, in particular for the manual workpiece charging of the device.

FIGS. 6 and 7 show further illustrations as to how a workpiece 105 can be clamped by means of the clamping jaws, wherein the workpiece 105 is not clamped on the upper side and on the lower side, but rather on surfaces which are arranged adjacent to the upper side and lower side.

Figure 8:
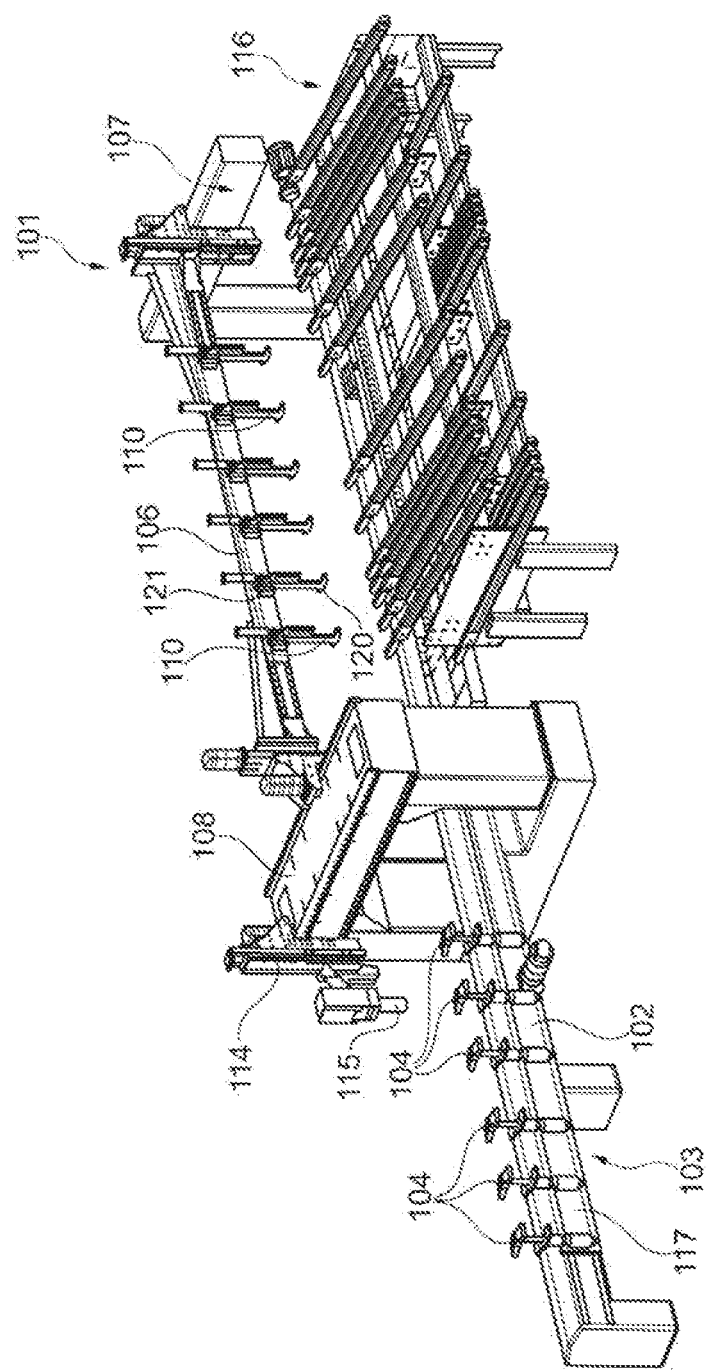
FIG. 8 shows a schematic illustration of an exemplary embodiment of a machining device.
Figure 9:
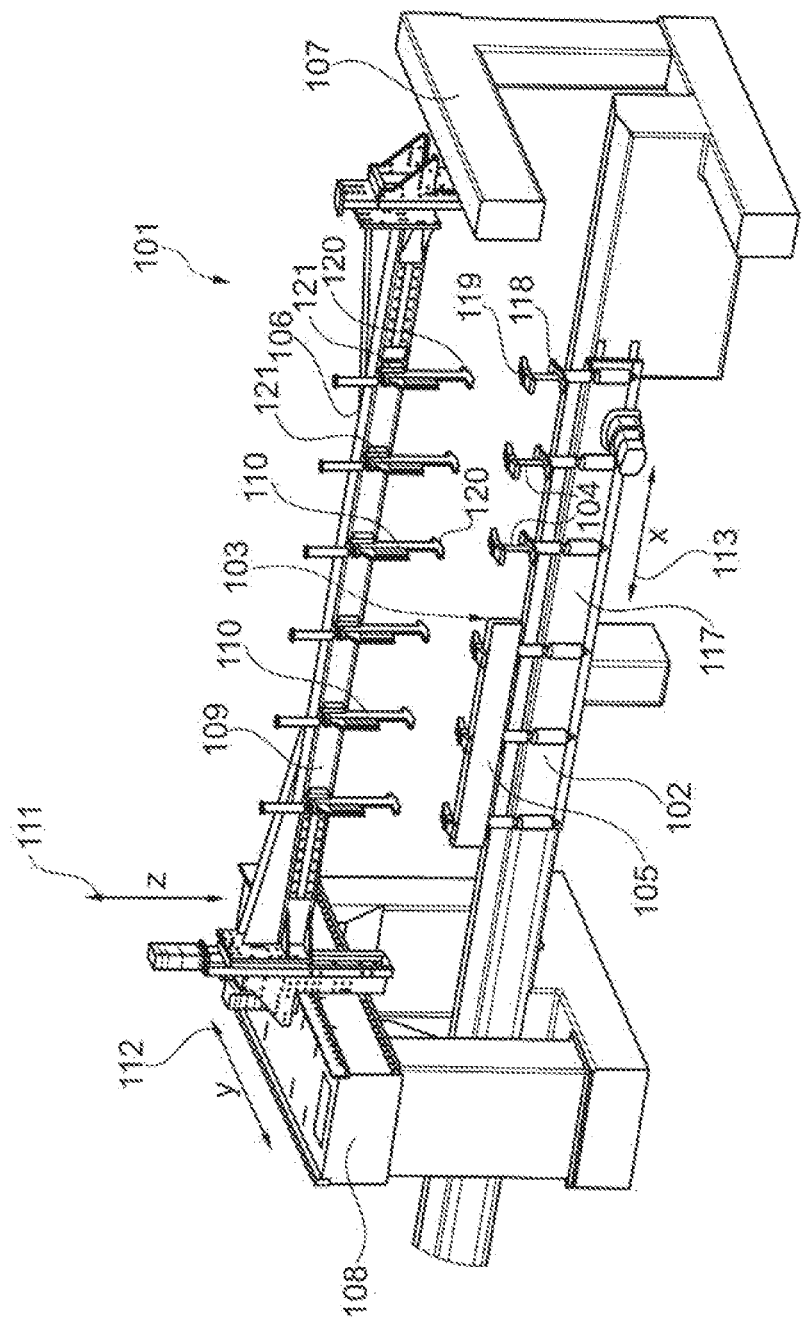
FIG. 9 shows a schematic illustration of a detail of the machining device according to FIG. 8.

FIGS. 8 and 9 show a further exemplary embodiment of a machining device 101, in particular for machining workpieces 105 made of wood, wood materials, plastic or the like. The workpieces here can be, for example, more elongate, beam-like workpieces or more flat, more two-dimensional, board-like workpieces.

The machining device 101 has a workpiece table 102 with a workpiece holder 103 with clamping elements 104 for clamping a workpiece 105, by means of which workpieces can be securely held for machining. The workpiece table 102 is preferably designed to be connected to an advancing unit, by means of which the workpiece table 102 is designed so as be shiftable in its longitudinal direction in direction 113. The direction 113 is advantageously oriented here perpendicular to the direction 111 and to the direction 112.

Furthermore, a supply device 106 is provided which serves to supply a workpiece to the workpiece holder 103 of the workpiece table 102 and to place the workpiece on the workpiece table 102.

Furthermore, a device framework 107 is provided on which the supply device 106, also called manipulator, is arranged so as to be shiftable. A guide device 108 is also provided to which the supply device 106 is furthermore coupled so as to be shiftable. The supply device 106 is arranged so as to be shiftable on one side on the device framework 107 and on the other side on the guide device 108. The guide device 108 also serves to arrange and to guide tools 115 thereon with a tool slide 114. The at least one tool 115 is mounted here on one side of the guide device 108, while the supply device 106 is mounted on the other side of the guide device 108 in a shiftable manner. Alternatively, a second device framework 107 can also be arranged adjacent to the guide device 108, and therefore the supply device 106 is guided so as to be shiftable by means of two device frameworks. It is then also advantageous if tools 115 are arranged on both sides on the guide device 108 so as to be shiftable, for example, by means of tool slides 114.

The supply device 106 can be moved with its elongate carrier element 109 and the clamping elements 110 arranged thereon both in the vertical direction 111 and also in the lateral direction 112 which is oriented perpendicular to the direction 111.

The clamping elements 110 are arranged spaced apart from one another here. The clamping elements 110 of the supply device 106 are advantageously arranged fixedly with respect to one another or in another exemplary embodiment, at least one clamping element or two or more clamping elements 110 of the supply device 106 is or are arranged on one end region of the supply device in a shiftable manner or alternatively on both end regions of the supply device 106.

The guide device 108 is advantageously designed as a gantry or crossmember on which a tool slide 114 is arranged in a shiftable manner in order to be able to shift a tool 115 in direction 112 and/or in direction 111. As a result, the workpiece 105 can be shifted in the longitudinal direction of the workpiece table 102 and can be guided past the tool 115 for the machining.

Furthermore, a supply and/or discharge table 116 can also be provided by means of which the workpieces 105 can be supplied and/or removed, and therefore a stock of workpieces 105 can be made available to the machining device 101 in order to be able to efficiently machine said workpieces or to be able to remove said workpieces again from the machining device 101 and supply them for further machining or commissioning.

The two FIGS. 8 and 9 each show only one workpiece table 102. Alternatively, two or more workpiece tables 102 can also be arranged parallel to one another and guided in a shiftable manner next to one another. For this purpose, the respective workpiece tables 102 can be shiftable at a distance from one another, for example guided on a rail.

According to an inventive concept, clamping of the workpieces with three-dimensional shifting or positioning is provided. For this purpose, three axes or three manipulation directions in the x, y and in the z direction are provided for the "three-dimensional" clamping of the workpieces 105. Here the x direction represents the direction 113, the y direction the direction 112 and the z direction the direction 111.

The machining device 101 of FIGS. 8 and 9 represents a device in which the workpieces can be shifted individually, or two or more workpieces 105 can be shifted relative to the workpiece table 102 along the three axes mentioned and therefore the workpiece 105 or the plurality of workpieces can be set up in such a manner that shifting can be undertaken in the directions mentioned during the transition from one setup to a second setup.

The various possibilities of shifting the workpiece 105 relative to a workpiece table 102 in order to achieve an attractive and in particular also economical device concept are distributed here between the workpiece table 102 and the supply device 106. Various combination possibilities for distributing the shifting possibilities along the directions 111, 112 and 113 mentioned are basically possible here.

FIGS. 8 and 9 show a machining device 101 in which the following combination of allocations of directions is used:
Shifting Along the x Axis: workpiece table 102,
Shifting Along the y Axis: supply device 106, and
Shifting Along the z Axis: supply device 106.

The individual workpiece table 102 or in the case of more than one workpiece table the respective workpiece tables is or are preferably designed here as a table of elongate design with a basic body 117 which is of correspondingly elongate design and on which the workpiece holder 103 with the clamping elements 104 arranged adjacent to one another is arranged. The clamping elements 104 are arranged adjacent to one another along the x direction 113, and therefore a workpiece 105 can be held with the clamping elements 104, wherein the workpiece 105 can be held by the clamping elements 104 in a manner oriented along the x direction 113. Since the respective workpiece table 102 is shiftable with its advancing device in the x direction 113, the workpiece holder 103 connected to said workpiece table is also shiftable in the x direction and therefore the clamping elements 104 are also shiftable in the x direction. As a result, prior to the positioning of the workpiece 105 in the clamping elements 104 of the workpiece table 102, the respective workpiece table 102 can be shifted in the x direction 113 in order to define the position of the workpiece 105 the x direction 113 relative to the workpiece table 102.

The clamping elements 104 consist of two clamping jaws 118, 119 which are shiftable with respect to each other and are shiftable in the z direction in order to clamp a workpiece 105 between them. It may also be advantageous here if, for example, the lower clamping jaw is of stationary design in the z direction and the upper clamping jaw is shiftable in the z direction with respect thereto. Alternatively, other clamping elements can also be provided. The clamping jaws 118, 119 protrude here in the y direction 112 in order to be able to clamp a workpiece 105 between them. It is advantageous here if the clamping jaws 118, 119 are designed in such a manner that the clamping jaws 118, 119 are arranged in pairs such that they are arranged protruding in both y directions, and therefore two setups between the two clamping jaw pairs 118, 119 are possible.

It can also be advantageous if the upper and/or the lower clamping jaws are rotatable, for example, by 90° in order to be spaced for a machining operation.

The distance between adjacent clamping elements 104 can advantageously be selected here to be of a size sufficient in order also to be able to carry out end finishing machining on a narrow side or advantageously on both narrow sides of the workpiece 105, i.e. on the short workpiece sides, between two adjacent clamping elements 104 and the longitudinal machining of a longitudinal side of the workpiece in one setup.

The supply device 106 likewise has an elongate basic body or a carrier element 109 on which the clamping elements 110 with two clamping jaws 120, 121, which protrude in the y direction 112 and are shiftable in the z direction 111, are arranged adjacent to and spaced apart from one another. The supply device 106 is itself of shiftable design in the y direction and in the z direction. As a result, the workpieces 105 both when inserted into the clamping jaws 118, 119 of the workpiece holder 103 and during the rechucking between the machining operations from one clamping jaw pair to the other clamping jaw pair can be offset in the x, y and in the z direction relative to the clamping jaws 118, 119.

It is also possible here for a plurality of workpieces 105 to be arranged next to one another in the x direction and at the same time to be clamped in the clamping jaws 118, 119 such that they can be machined simultaneously.

The plurality of individual workpieces 105 can be picked up simultaneously next to one another with the supply device 106, and therefore the position of said workpieces can be changed simultaneously in the x, y and in the z direction.

For the insertion of workpieces, it is even possible to take into consideration a machining operation undertaken on the unmachined part, for example previously separated glass strips, and therefore the workpiece can optionally already be clamped in a rebate which is present, instead of on the upper side or lower side of the workpiece 105. A glass strip, for example, can also be removed from the workpiece 105 by means of the supply device 106. Alternatively, other elements can also be taken away or removed. Furthermore, elements, such as a fitting, an RFID chip or other elements, can also be supplied to the workpiece on the workpiece table 102 by means of the supply device 106.

By means of the offset of the workpieces 105, even parts with a negative clamping yoke offset downward can be picked up and clamped. The parts are normally clamped on the upper side and lower side in the clamping device. The overlapping of the two clamping surfaces is the "clamping yoke". The trend is toward profiles with a very small or even negative clamping yoke, if any at all. This does not result in any overlapping of the upper and lower side. The workpiece then has to be clamped in the rebate.

The device according to the invention can advantageously be used as described below.

The workpiece, for example as an unmachined part, is picked up by the supply device 6, 106 from the retrieving position of the workpiece inlet on the supply table 16, 116.

The workpiece 105 is subsequently placed into the clamping jaws 118, 119 of the workpiece holder by means of the supply device for the first setup. The position of the workpiece 105 can be oriented variably here in the y and z direction, depending on the intended machining operations to be carried out on the workpiece 105, wherein the y and z orientation can be selected by shifting the supply device 106 along the axes of the supply device 106.

Figure 10:
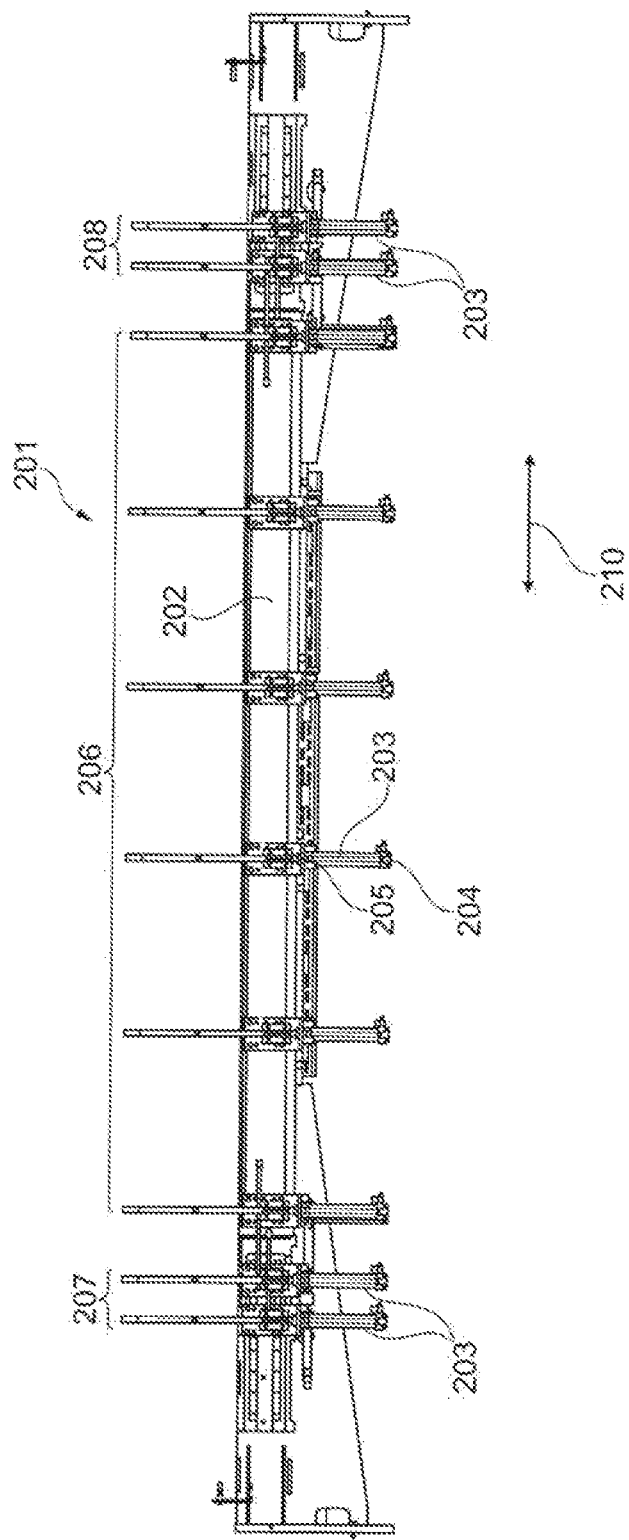
FIG. 10 shows an illustration of a supply device.

FIG. 10 shows a supply device 201 with an elongate basic body 202 on which the clamping elements 203 with two clamping jaws 204, 205 protruding in the y direction, wherein at least one clamping jaw thereof is shiftable in the z direction 111, are arranged adjacent to and spaced apart from one another. The supply device 201 is itself designed to be shiftable in the y direction and in the z direction. It can be seen in FIG. 10 that the clamping elements 203 are arranged fixedly in a central region 206 of the supply device 201. Two clamping elements 203 are in each case formed in a shiftable manner on the end regions 207, 208, and therefore the distance between the clamping elements in the x direction 210 can be adjusted. For this purpose, the clamping elements 203 can be guided on the basic body 202 on a type of rails or in grooves or the like and can be lockable. The shifting can be undertaken here by means of a drive unit, such as by means of a pneumatic, hydraulic or electric actuator.

Figure 11:
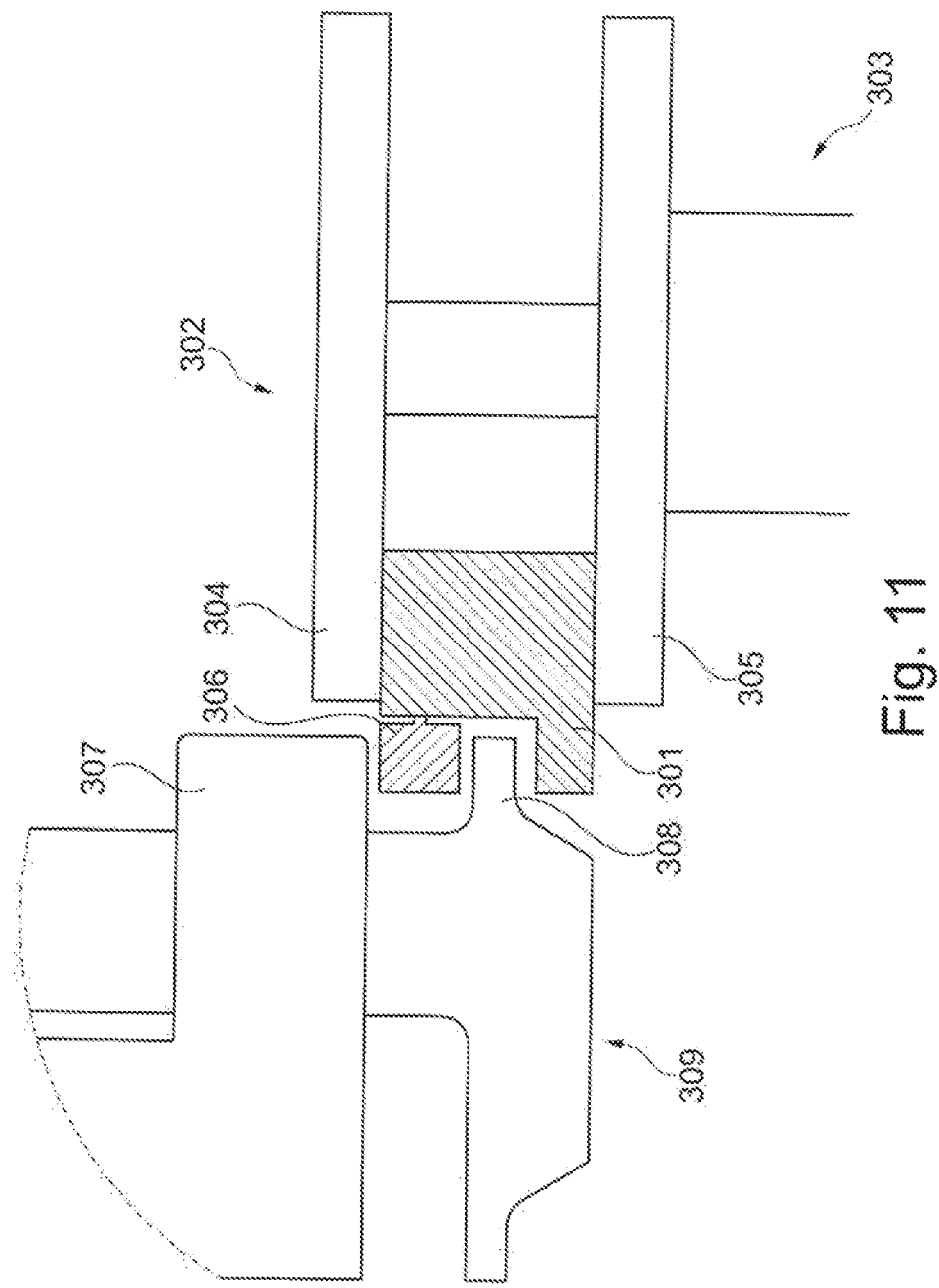
FIG. 11 shows an illustration of a workpiece in the setup of a clamping element of a workpiece table in section.

FIG. 11 shows a workpiece 301 in a setup of a clamping element 302 of a workpiece table 303 in section. The workpiece 301 is held here by upper and lower clamping jaws 304, 305. A glass strip 306 is formed on the workpiece 301 and can be gripped and removed by means of the clamping elements 307, 308 of a supply device 309.

The described machining operation here is in particular a machining operation, such as milling, sawing and/or drilling.

LIST OF REFERENCE SIGNS

1 Machining device
2 Workpiece table
3 Workpiece holder
4 Clamping element
5 Workpiece
6 Supply device
7 Device framework
8 Guide device
9 Carrier element
10 Clamping element
11 z direction
12 y direction
13 x direction
14 Tool slide
15 Tool
16 Supply and/or discharge table
17 Basic body
18 Clamping jaw
19 Clamping jaw
20 Clamping jaw
21 Clamping jaw
22 Charging region
23 Arrow
24 Machining region
101 Machining device
102 Workpiece table
103 Workpiece holder
104 Clamping element
105 Workpiece
106 Supply device
107 Device framework
108 Guide device
109 Carrier element
110 Clamping element
111 z direction
112 y direction
113 x direction
114 Tool slide
115 Tool
116 Supply and/or discharge table
117 Basic body
118 Clamping jaw
119 Clamping jaw
120 Clamping jaw
121 Clamping jaw
201 Supply device
202 Basic body
203 Clamping element
204 Clamping jaw
206 Central region
207 End region
208 End region
210 x direction
301 Workpiece
302 Clamping element
303 Workpiece table
304 Clamping jaw
305 Clamping jaw
306 Glass strip
307 Clamping element
308 Clamping element
309 Supply device

The invention claimed is:

1. A machining device comprising:
at least one workpiece table with a workpiece holder for holding at least one workpiece,
a supply device for supplying the at least one workpiece to the at least one workpiece table,
wherein the at least one workpiece is positionable in three dimensions with respect to the at least one workpiece table,
wherein the at least one workpiece table is shiftable in a longitudinal direction of the at least one workpiece table relative to the supply device using a first advancing unit, wherein the supply device is shiftable in two directions relative to the at least one workpiece table using a second and third advancing unit.

2. The machining device as claimed in claim 1,
wherein two or more workpiece tables is or are provided.

3. The machining device as claimed in claim 1,
wherein the workpiece holder of at least one workpiece table has a plurality of clamping elements which are arranged spaced apart from one another in the longitudinal direction of the at least one workpiece table.

4. The machining device as claimed in claim 3,
wherein each clamping element has at least one pair of clamping jaws, wherein each pair of clamping jaws has two clamping jaws, wherein at least one of the clamping jaws is shiftable relative to the other clamping jaw.

5. The machining device as claimed in claim 4,
wherein each clamping element has two pairs of clamping jaws.

6. The machining device as claimed in claim 4,
wherein the clamping jaws of each pair each protrude in a direction perpendicular to the longitudinal direction of the at least one workpiece table.

7. The machining device as claimed in claim 5,
wherein the clamping jaws of a first pair of clamping jaws protrude in a first direction perpendicular to the longitudinal direction of the at least one workpiece table, wherein the clamping jaws of a second pair of clamping jaws protrude in a direction opposed to the first direction perpendicular to the longitudinal direction of the at least one workpiece table.

8. The machining device as claimed in claim 1,
wherein the least one workpiece is suppliable using the supply device to the at least one workpiece table in such a manner that one workpiece or a plurality of workpieces is holdable simultaneously.

9. The machining device as claimed in claim 1,
wherein a plurality of workpieces are suppliable simultaneously using the supply device to the at least one workpiece table in such a manner that the plurality of workpieces are holdable simultaneously by the at least one workpiece table.

10. The machining device as claimed in claim 1,
wherein the supply device has a plurality of clamping elements which are arranged spaced apart from one another in the longitudinal direction of the supply device.

11. The machining device as claimed in claim 10,
wherein each clamping element of the plurality of clamping elements has at least one pair of clamping jaws with two clamping jaws, wherein at least one of the clamping jaws is shiftable relative to the other clamping jaw.

12. The machining device as claimed in claim 10,
wherein each clamping element has two pairs of clamping jaws, wherein each pair of clamping jaws has two clamping jaws, wherein in each case at least one of the clamping jaws of each pair is shiftable relative to the other clamping jaw of the pair.

13. The machining device as claimed in claim 11,
wherein the clamping jaws of each pair each protrude in a direction perpendicular to the longitudinal direction of the at least one workpiece table.

14. The machining device as claimed in claim 12,
wherein the clamping jaws of a first pair protrude in a first direction perpendicular to the longitudinal direction of the at least one workpiece table, wherein the clamping jaws of a second pair protrude in a direction opposed to the first direction perpendicular to the longitudinal direction of the at least one workpiece table.

15. The machining device as claimed in claim 1,
wherein the supply device, at least in a central region, as viewed in the longitudinal direction, has clamping jaw pairs which are arranged spaced apart from one another and fixed with respect to one another in the longitudinal direction.

16. The machining device as claimed in claim 1,
wherein the supply device, at least on one of its end regions, as viewed in the longitudinal direction, has at least one clamping jaw pair which is arranged so as to be shiftable in the longitudinal direction.

17. The machining device as claimed in claim 1,
wherein the supply device, at least on one of its end regions, as viewed in the longitudinal direction, has at least two clamping jaw pairs which are arranged so as to be shiftable in the longitudinal direction.

18. The machining device as claimed in claim 16,
wherein the shiftable clamping jaw pair of the supply device is adjustable and fixable in their position in the longitudinal direction.

19. The machining device as claimed in claim 15,
wherein the shiftable clamping jaw pair is or are shiftable using a drive unit.

20. The machining device as claimed in claim 3, wherein each clamping element of the plurality of clamping elements has at least one pair of clamping jaws with two clamping jaws, wherein one of the clamping jaws is rotatable relative to the other clamping jaw by up to 90°.

21. A method for operating a machining device, the method comprising:
providing a machining device according to claim 1,
guiding the at least one workpiece to the at least one workpiece table and positioning the at least one workpiece thereon using the supply device,
positioning the at least one workpiece in three dimensions with respect to the at least one workpiece table,
wherein the workpiece table is displaced relative to the supply device in at least the longitudinal direction when positioning the at least one workpiece, wherein the supply device is displaced in at least two directions relative to the workpiece table when positioning the at least one workpiece.

22. The method as claimed in claim 21,
wherein the workpiece holder has pairs of clamping jaws configured to permit a workpiece to be clamped in the workpiece holder of the at least one workpiece table.

23. The method as claimed in claim 21,
wherein the workpiece holder has at least two sets of pairs of clamping jaws configured to permit a workpiece to be clamped in the workpiece holder of the at least one workpiece table,
wherein the at least one workpiece is transferable from a first set of pairs to a second set of pairs.

24. The method as claimed in claim 23,
wherein the workpiece is clamped in the pairs of clamping jaws of the workpiece holder of the at least one workpiece table.

25. The method as claimed in claim 24,
wherein the at least one workpiece, following clamping in the workpiece holder, is machined on a longitudinal side by at least one tool.

26. The method as claimed in claim 24,
wherein the at least one workpiece, following clamping in the workpiece holder, is machined with end finishing machining on a narrow side by at least one tool.

27. The method as claimed in claim 24,
wherein the at least one workpiece, following clamping in the workpiece holder, is machined with end finishing machining on both narrow sides by at least one tool.

28. The method as claimed in claim 25,
wherein, following a machining of the at least one workpiece, the at least one workpiece is rechucked into the second set of clamping jaws, for the further machining of the at least one workpiece on a second longitudinal side or on at least one of the narrow sides.

29. The method as claimed in claim 28,
wherein, following a machining step, the at least one workpiece is removed from the at least one workpiece table by the supply device.

30. The method as claimed in claim 21,
wherein a glass strip or another element is removable from a workpiece by using the supply device with at least individual pairs of its clamping jaw pairs.

31. The method as claimed in claim 21,
wherein a fitting, an RFID chip, or another element is suppliable to the at least one workpiece by using the supply device with at least individual pairs of its clamping jaw pairs.

\* \* \* \* \*